United States Patent
Sakai (10) Patent No.: US 9,188,779 B2
(45) Date of Patent: Nov. 17, 2015

(54) DISPLAY APPARATUS AND HEAD-UP DISPLAY SYSTEM HAVING THE SAME

(71) Applicant: Seiji Sakai, Tokyo (JP)

(72) Inventor: Seiji Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 13/791,639

(22) Filed: Mar. 8, 2013

(65) Prior Publication Data

US 2013/0265646 A1 Oct. 10, 2013

(30) Foreign Application Priority Data

Apr. 4, 2012 (JP) ................. 2012-085240

(51) Int. Cl.
*G02B 27/01* (2006.01)

(52) U.S. Cl.
CPC ............ *G02B 27/01* (2013.01); *G02B 27/0101* (2013.01); *G02B 2027/0134* (2013.01)

(58) Field of Classification Search
CPC ............... G02B 27/01; G02B 27/0101; G02B 27/0134; G02B 27/0149
See application file for complete search history.

(56) References Cited

U.S. PATENT DOCUMENTS

| 4,999,011 A | 3/1991 | Suzuki et al. |
| 5,371,510 A * | 12/1994 | Miyauchi et al. ................. 345/7 |

FOREIGN PATENT DOCUMENTS

| JP | 63-164038 U | 10/1988 |
| JP | 2007-264529 A | 10/2007 |

* cited by examiner

*Primary Examiner* — Joseph P Martinez (74) *Attorney, Agent, or Firm* — Studebaker & Brackett PC (57) ABSTRACT

The display apparatus of the present invention is a display apparatus for a head-up display, and is provided with a liquid crystal display which has a single display region including a first display region and a second display region, a half mirror which reflects first exit light exiting from the first display region of the liquid crystal display, and a plane mirror which reflects second exit light exiting from the second display region of the liquid crystal display toward the half mirror. The first exit light which has been reflected by the half mirror and the second exit light which has penetrated the half mirror are led out of the apparatus in an overlapping state.

15 Claims, 10 Drawing Sheets

DISPLAY APPARATUS AND HEAD-UP DISPLAY SYSTEM HAVING THE SAME

BACKGROUND OF THE INVENTION

1. Field of the Invention

The present invention relates to a head-up display used in a vehicle such as a motor vehicle.

2. Description of the Background Art

A head-up display projects a display image of a display device on a projection surface such as a windshield positioned in front of a driver's seat. A virtual image is displayed anterior to the windshield to a driver. Therefore, a driver can visually recognize the display image without widely moving his/her eyes.

Japanese Utility Model Application Laid-Open No. 63-164038 (1988) discloses a head-up display provided with first and second display devices, a half mirror, and a housing which houses the first and second display devices and the half mirror inside thereof. By using this head-up display, in front of a driver, two virtual images which are formed at different positions from each other are displayed so as to overlap with an outside view in front of a windshield. However, since the two virtual images are displayed to be parallel to each other, there is a problem in that the displayed image is planar and has no stereoscopic effect.

On the other hand, in a head-up display disclosed in Japanese Patent Application Laid-Open No. 2007-264529, an angle of a first display device and an angle of a second display device with respect to a half mirror are made different from each other so that displayed angles of two virtual images are different from each other, thereby displaying an image having a stereoscopic effect.

However, the head-up display of Japanese Patent Application Laid-Open No. 2007-264529 requires two display devices in order to display a stereoscopic image. Further, it is necessary to set the angle of each of the display devices. Therefore, there is a problem in that the structure of the head-up display is made to be complicated.

SUMMARY OF THE INVENTION

It is an object of the present invention to provide a display apparatus having a simple structure and a head-up display system including the same.

A first display apparatus of the present invention is a display apparatus for a head-up display, and includes a display part, a half mirror, and a first reflective plate. The display part has a single display region including a first display region and a second display region. The half mirror reflects first exit light exiting from the first display region of the display part. The first reflective plate reflects second exit light exiting from the second display region of the display part toward the half mirror. In the first display apparatus of the present invention, the first exit light reflected by the half mirror and the second exit light penetrating the half mirror are led out of the display apparatus in an overlapping state.

Since two virtual images can be displayed by using a single display part, it is possible to achieve a display apparatus for a head-up display with a simple structure.

A second display apparatus of the present invention is a display apparatus for a head-up display, and includes a dual display, a half mirror, and a first reflective plate. The dual display has a display surface, and displays a first image within a first elevation angle range from the display surface and a second image within a second elevation angle range from the display surface. The half mirror is provided within the first elevation angle range and reflects display light of the first image. The first reflective plate is provided within the second elevation angle range and reflects display light of the second image toward the half mirror. In the second display apparatus of the present invention, display light of the first image reflected by the half mirror and display light of the second image penetrating the half mirror are led out of the display apparatus in an overlapping state.

Since two virtual images can be displayed by using a single dual display, it is possible to achieve a display apparatus for a head-up display with a simple structure.

These and other objects, features, aspects and advantages of the present invention will become more apparent from the following detailed description of the present invention when taken in conjunction with the accompanying diagrams.

DESCRIPTION OF THE PREFERRED EMBODIMENTS

A. Preferred Embodiment 1

A-1. Configuration

Figure 1:
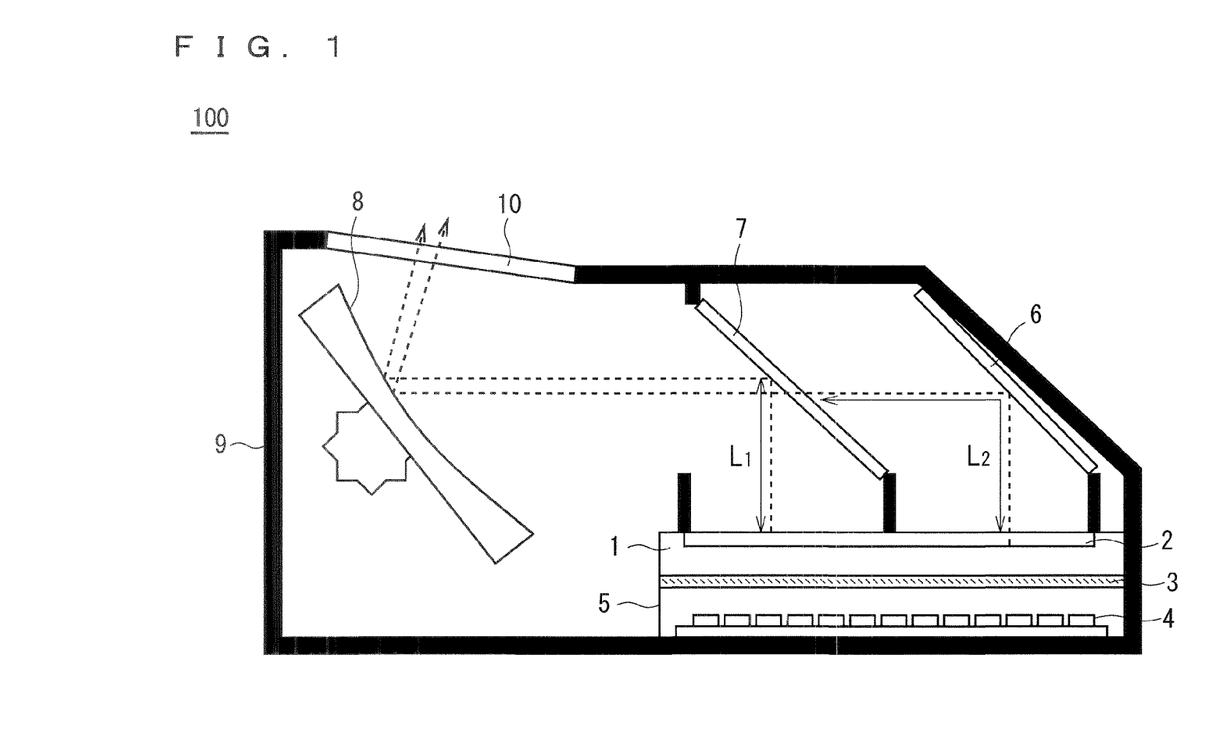
FIG. 1 is a cross-sectional view of a display apparatus according to a preferred embodiment 1.
Figure 2:
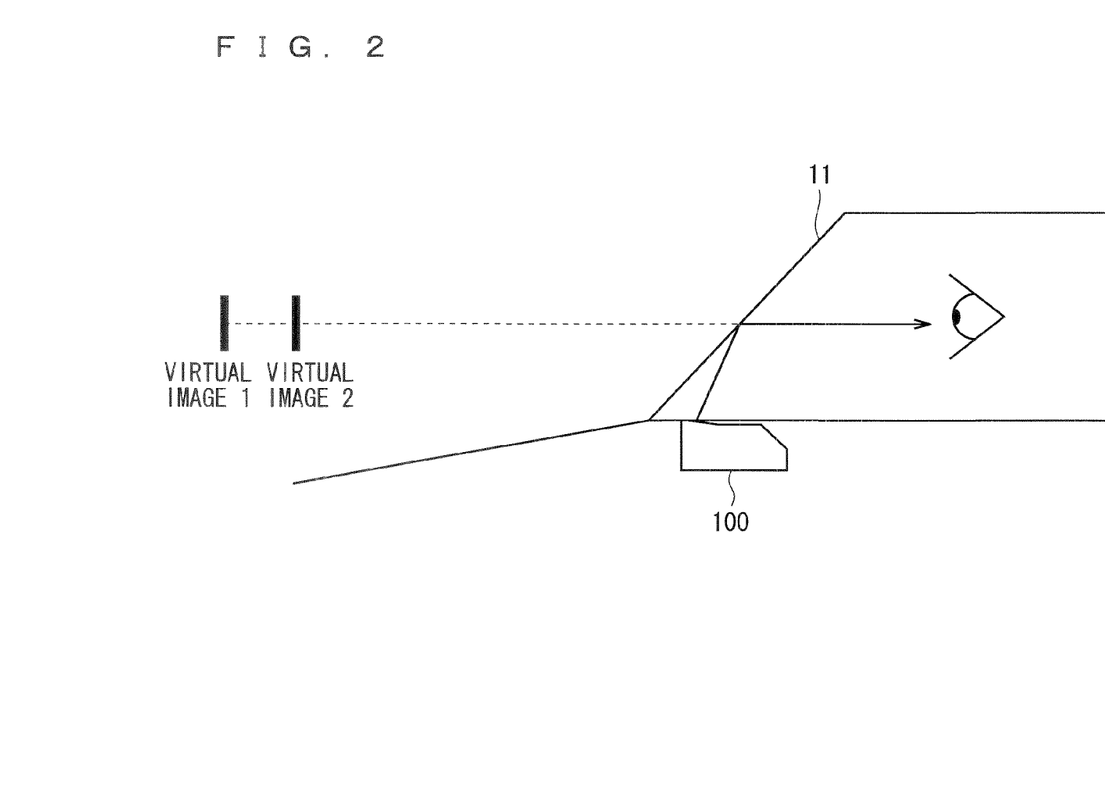
FIG. 2 is a diagram illustrating positions of virtual images of the display apparatus according to the preferred embodiment 1.

FIG. 1 is a cross-sectional view illustrating the configuration of a display apparatus 100 for a head-up display according to a preferred embodiment 1; and FIG. 2 is a diagram illustrating a usage state of the display apparatus 100. The display apparatus 100 is mounted, for example, on a vehicle such as a motor vehicle. Light output from the display apparatus 100 is reflected by a windshield 11 and then reaches a driver, and the driver thereby visually recognizes virtual images at positions anterior to the windshield 11.

The display apparatus 100 is provided with a liquid crystal display 1 as a sole display device, a half mirror 7, a plane mirror 6, and a concave mirror 8. The display apparatus 100 is further provided with a housing 9 for positioning and housing these elements.

The liquid crystal display 1 is provided with a backlight, a liquid crystal panel 2 which is arranged above the backlight, and a circuit board which drives the liquid crystal panel 2. The liquid crystal display 1 is further provided with a case 5 for positioning and housing these elements. The backlight is provided with LEDs 4 as light sources and a translucent resin plate 3 which is arranged above the LEDs 4.

The liquid crystal panel 2 is a display unit to which the birefringence of a liquid crystal is applied. The liquid crystal panel 2 is formed in such a manner that a counter substrate and a TFT array substrate are arranged so as to face each other with a spacer interposed therebetween, and the circumferences of the arranged substrates are bonded together with a seal material. The counter substrate is an insulating substrate such as glass. On the counter substrate, a colored layer, a light shielding layer, a counter electrode and the like are formed. The TFT array substrate is also an insulating substrate such as glass. On the TFT array substrate, a thin film transistor (TFT) which serves as a switching element, a pixel electrode and the like are formed.

There is formed an inlet port on the circumference of the counter substrate and the TFT array substrate which are bonded together with the seal material. By injecting a liquid crystal from the inlet port, and then sealing the inlet port with a sealant, the liquid crystal is sandwiched between both of the substrates.

The liquid crystal panel 2 is further provided with alignment layers for aligning the liquid crystal and polarization plates. Since a commonly-used liquid crystal panel is used as the liquid crystal panel 2 in the present invention, a detailed description thereof will be omitted.

In the circuit board which drives the liquid crystal panel 2, a copper pattern is formed on a glass epoxy board and the like, and a plurality of electronic components are solder-mounted thereon. The circuit board is mechanically connected to the case 5 of the liquid crystal display 1 with a fixing screw, a standoff, a hook nail or the like.

Further, a protection cover is attached to the circuit board in order to protect the circuit board from external pressure and static electricity. An aluminum-coated steel plate, a stainless-coated steel plate, a zinc-coated steel plate or the like is used as the material of the protection cover. Further, a sheet made of resin such as PET is bonded to a surface of the protection cover, the surface facing the circuit board, in order to prevent electrical contact with the circuit board and the electronic components on the circuit board. The protection cover is mechanically connected to an inner surface of the case 5 of the liquid crystal display 1 with a screw, a standoff or the like. Further, the protection cover includes a hole (through hole) near a variable resistance on the circuit board so that the variable resistance can be controlled in a state where the circuit board and the protection cover are attached to the liquid crystal display 1. Further, when external pressure is not large, it is also possible to substitute a PET sheet for the protection cover. In this case, it is not necessary to have a resin sheet for insulation bonded between the PET sheet and the circuit board. Therefore, the number of components can be reduced, thereby making it possible to reduce costs.

Next, the configuration of the backlight will be described. A light source substrate is provided on a bottom surface of the case 5. A plurality of LEDs 4 as point light sources are mounted on the light source substrate at predetermined intervals. On the light source substrate, there is formed a circuit pattern for supplying power to the LEDs 4. When the light source substrate is composed of a thin flat cable, it is possible to efficiently transfer heat from the LEDs 4 to the surrounding area, and also possible to reduce the outer size of a light source device which is composed of the light source substrate and the LEDs 4.

As a light source other than a LED, there are a point light source such as a laser diode and a line light source such as a cold cathode fluorescent lamp. A semiconductor light emitting element which emits monochromatic light such as blue light and a pseudo white LED which is composed of a phosphor which absorbs a part of blue light emitted from the semiconductor light emitting element to thereby emit yellow light can be used as a LED. Further, it is also possible that monochromatic LEDs each of which emits red light, green light and blue light be provided, and these monochromatic light beams be combined to thereby form white light. In the present preferred embodiment, a pseudo white LED is used as a point light source.

On a surface of the translucent resin plate 3, the surface facing the LEDs 4, there are formed plano-convex lenses whose focal point are respective light emitting points of the respective LEDs 4 in order to focus light from the LEDs 4. Further, in order to achieve a convex shape of a lens, Fresnel lenses whose focal points are respective light emitting points of the respective LEDs 4 may also be used. Further, an optical sheet may be optionally arranged on the translucent resin plate 3. Furthermore, in order to adjust the orientation of luminance of the liquid crystal display 1, a viewing angle adjusting film may also be used.

In the present preferred embodiment, a direct type backlight having the translucent resin plate 3 is used. However, an edge light type backlight which is provided with a light guide plate which causes light to propagate in a planar manner and a LED arranged on an end face of the light guide plate so as to cause light from the LED to propagate within the light guide plate and then output the light in a planar manner may be used.

The case 5 has a function to conduct heat released from the LEDs 4 therethrough and then release the heat to the outside. Further, since the case 5 needs to house structural members of the liquid crystal display 1 and position the structural members in respective predetermined positions, the case 5 is required to have high intensity. Therefore, the material of the case 5 is desirably a metal having high intensity and high thermal conductivity. In particular, by using aluminum or aluminum alloy having high thermal conductivity, it is possible to efficiently diffuse heat from the LEDs 4 to thereby lower the temperature of the LEDs 4. Further, in order to efficiently release the heat that has spread through the case 5 into the atmosphere, it is desirable to arrange the case 5 so as to be in contact with the housing 9.

Next, structural members of the display apparatus 100 other than the liquid crystal display 1 will be described. The half mirror 7 has the property of transmitting a part of light and specularly reflecting the other part of the light. There are a metal film method in which a reflective film is formed onto a glass substrate and the like by vapor deposition and a dielectric multilayer method as a manufacturing method of the half mirror 7. As the material of the metal film, chrome, aluminum, silver or the like is used. The half mirror 7 is provided above the liquid crystal display 1. In a case where the liquid crystal panel 2 is divided into right and left in FIG. 1, and the left side thereof is determined as a first display region and the right side thereof is determined as a second display region, the half mirror 7 is positioned in the housing 9 above the first display region and reflects light exiting from the first display region toward the concave mirror 8. In the present specification, also in the other drawings, descriptions will be made by determining the left side of the liquid crystal panel 2 in the liquid crystal display 1 as the first display region and the right side thereof as the second display region.

The concave mirror 8 reflects light from the half mirror 7 to the outside through a window portion 10 of the housing 9. The concave mirror 8 has a rotation shaft. Therefore, the mounting angle of the concave mirror 8 can be adjusted by rotating the concave mirror 8 about the rotation shaft by a stepping motor and the like. The concave mirror 8 is configured in such a manner that aluminum is vapor-deposited on glass or polycarbonate to thereby form a reflective film. By forming the concave mirror 8 so as to have an aspherical surface rather than a spherical surface, distortion of a virtual image can be reduced.

The plane mirror 6 is provided at the opposite side of the concave mirror 8 with respect to the half mirror 7, namely above the second display region of the liquid crystal panel 2. The plane mirror 6 is configured in such a manner that aluminum is vapor-deposited on glass or polycarbonate to thereby form a reflective film.

The liquid crystal display 1, the half mirror 7, the concave mirror 8, and the plane mirror 6 whose configurations are described in the above are provided inside the housing 9 and positioned by the housing 9. The hosing 9 is made of aluminum or magnesium die-cast having high heat-releasing property and high intensity. Further, the housing 9 includes the window portion 10 which is formed by fitting polycarbonate made of a translucent resin into a frame of the housing 9. Light reflected by the concave mirror 8 exits through the window portion 10.

A-2. Action

Next, the action of light emitted from the LEDs 4 until the light is visually recognized as virtual images by a driver will be described with reference to FIG. 1.

Light emitted upward from each of the LEDs 4 is collected by a Fresnel lens and the like formed on a surface of the translucent resin plate 3, the surface facing the LEDs 4, to thereby form parallel light which is perpendicular to the translucent resin plate 3. The parallel light passes through an optical sheet (not shown) which is provided on the translucent resin plate 3 and enters the liquid crystal panel 2.

Further, light that has penetrated the first display region of the liquid crystal panel 2 is reflected by the half mirror 7 which is arranged so as to be inclined at approximately 45° with respect to the liquid crystal panel 2, and is further reflected by the concave mirror 8. The light reflected by the concave mirror 8 exits out of the housing 9 through the window portion 10, and is then reflected by the windshield 11, so that the light is directed to a driver, as shown in FIG. 2.

Further, light that has penetrated the second display region of the liquid crystal panel 2 is reflected by the plane mirror 6 which is arranged so as to be inclined at approximately 45° with respect to the liquid crystal panel 2. The thus reflected light penetrates the half mirror 7, and is further reflected by the concave mirror 8. The light reflected by the concave mirror 8 exits out of the housing 9 through the window portion 10, and is then reflected by the windshield 11, so that the light is directed to a driver, as shown in FIG. 2. The windshield 11 shown in FIG. 2 is an example of a light transmissive substrate which reflects light output from the display apparatus 100 toward a driver. That is, the head-up display system is composed of the display apparatus 100 and the light transmissive substrate.

Both of the light that has penetrated the first display region of the liquid crystal panel 2 and the light that has penetrated the second display region thereof are directed to a driver, there is a difference between a light path L1 and a light path L2 leading to the half mirror 7. Therefore, the light that has penetrated the first display region of the liquid crystal panel 2 forms a virtual image 1 shown in FIG. 2, and, on the other hand, the light that has penetrated the second display region forms a virtual image 2 shown in FIG. 2. A distance between the virtual image 1 and the virtual image 2 has a property of becoming larger in proportion to a value obtained by "L2−L1". That is, the distance between the virtual image 1 and the virtual image 2 can be increased by increasing the value of "L2−L1".

Further, distances of a driver to the virtual images 1 and 2 can be increased by increasing the curvature of the concave mirror 8. On the contrary, distances of a driver to the virtual images 1 and 2 can be reduced by decreasing the curvature of the concave mirror 8. When the curvature of the concave mirror 8 is increased, virtual images are displayed so as to overlap with an outside view at positions farther from a driver. Therefore, a driver can visually recognize the virtual images without moving focus of his/her eyes while visually recognizing the outside view. Accordingly, it is possible to more safely obtain information about a driving speed and the like from the virtual images.

Further, a plane mirror may be used instead of the concave mirror 8. The plane mirror is configured in such a manner that aluminum is vapor-deposited on glass or polycarbonate to thereby form a reflective surface as with the concave mirror 8. The plane mirror has high availability because the plane mirror can be easily manufactured at low cost compared to the concave mirror and the materials thereof are common materials. Further, when the plane mirror is used, the distance between a driver and each of the virtual images can be optionally changed by providing a concave lens between the half mirror 7 and the windshield 11 and adjusting the curvature of the concave lens.

Further, the distance between the virtual image 1 and the virtual image 2 can be further increased by using a concave mirror instead of the plane mirror 6 and increasing the curvature of the concave mirror. Accordingly, when a driver sees a near position, the driver can visually recognize the virtual image 1. On the other hand, when a driver sees a far position, the driver can visually recognize the virtual image 2. Therefore, the driver can see the images over a wide area.

Further, the distance between the virtual image 1 and the virtual image 2 can be further increased by providing a concave lens (not shown) on the light path L2 leading from the second display region of the liquid crystal panel 2 to the half mirror 7 and adjusting the curvature of the concave lens. Further, the distance between the virtual image 1 and the virtual image 2 can be increased also by providing a plurality of concave lenses on the light path L2.

Further, an image displayed on the first display region of the liquid crystal panel 2 and an image displayed on the second display region thereof may have the same contents with each other, or different contents from each other. However, when both of the first display region and the second display region display the same image, in order to produce an effect for causing a driver to visually recognize images in a wider area, it is preferred that important information for driving such as a driving speed value be displayed on both of the first display region and the second display region.

Although a liquid crystal display is used as a display part of the display apparatus 100, an organic EL or other display devices may also be used.

A-3. Variation

Figure 3:
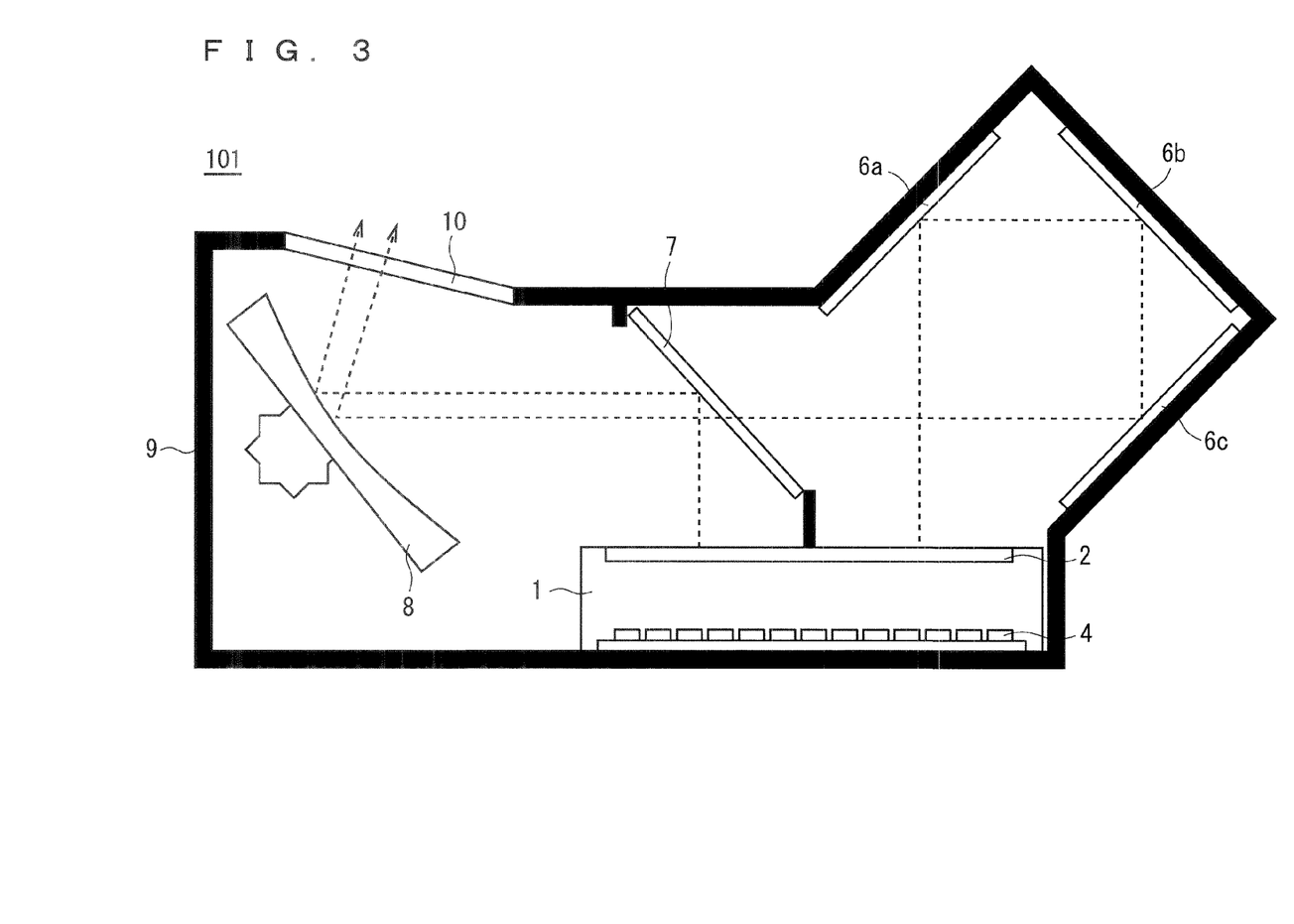
FIG. 3 is a cross-sectional view of a display apparatus according to a variation of the preferred embodiment 1.

FIG. 3 is a cross-sectional view illustrating the configuration of a display apparatus 101 according to a variation of the preferred embodiment 1. In FIG. 3, the same elements as those in the display apparatus 100 shown in FIG. 1 will be denoted by the same reference numerals as those in FIG. 1.

The display apparatus 101 is provided with multiple stages of plane mirrors 6a, 6b and 6c instead of the plane mirror 6 of the display apparatus 100. Each of the plane mirrors 6a, 6b and 6c is provided so as to be inclined at 45 degrees with respect to the liquid crystal panel 2. The plane mirror 6a is provided above the second display region of the liquid crystal panel 2, and a normal line thereof extends to the lower right in FIG. 3. The plane mirror 6b is a next-stage plane mirror of the plane mirror 6a, and a normal line thereof extends to the lower left in FIG. 3. The planner mirror 6c is a next-stage plane mirror of the plane mirror 6b, and a normal line thereof extends to the upper left in FIG. 3. Since the configuration of the display apparatus 101 other than the plane mirrors 6a, 6b and 6c is the same as the configuration of the display apparatus 100, a description thereof will be omitted.

Light that has exited from the second display region of the liquid crystal panel 2 is first reflected by the plane mirror 6a. The light reflected by the plane mirror 6a is then reflected by the plane mirror 6b. Further, the light reflected by the plane mirror 6b is reflected by the plane mirror 6c, and then enters the half mirror 7.

Figure 4:
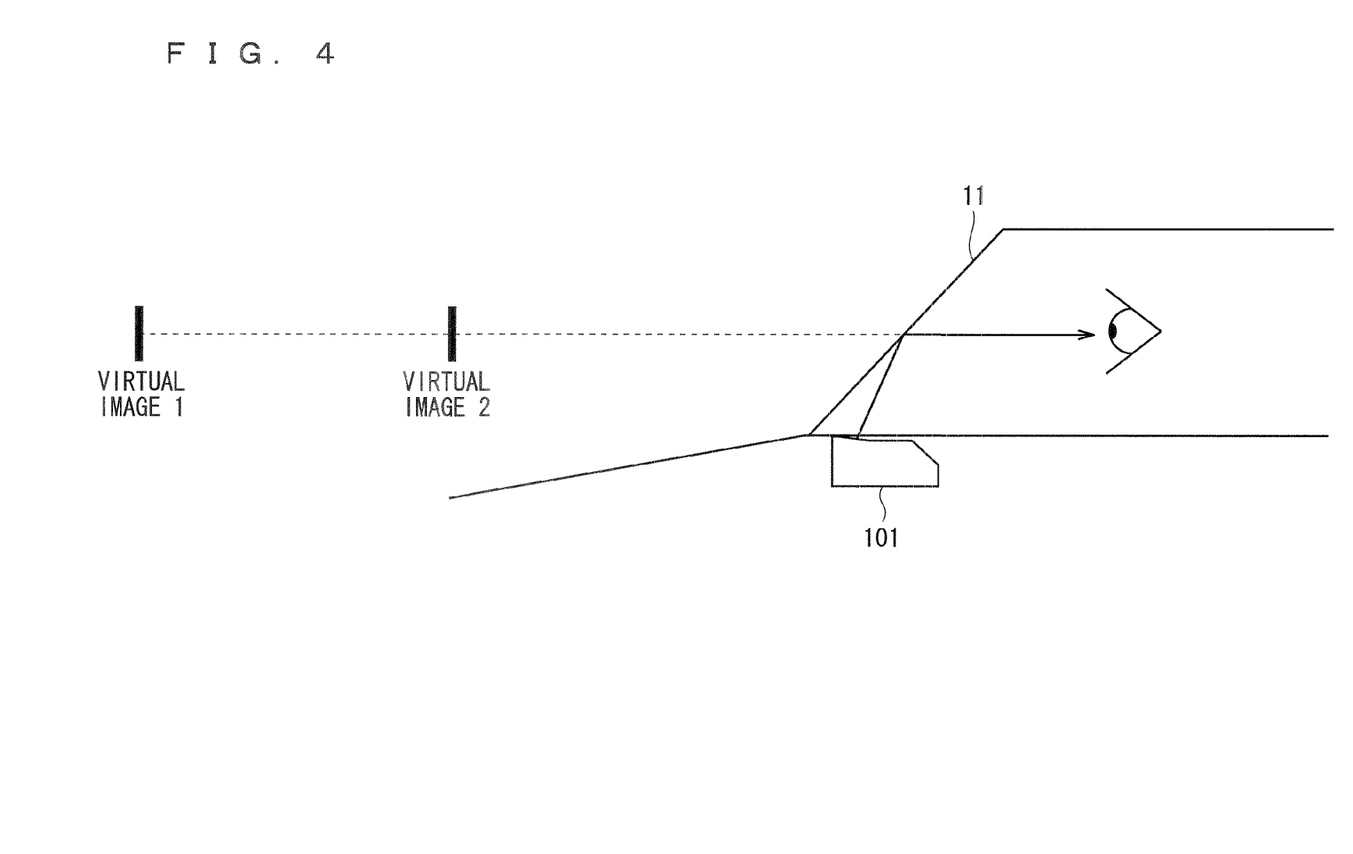
FIG. 4 is a diagram illustrating positions of virtual images of the display apparatus according to the variation of the preferred embodiment 1.

By using the plurality of plane mirrors 6a, 6b and 6c in this manner, it is possible to make the light path L2 leading from the second display region of the liquid crystal panel 2 to the half mirror 7 longer than the light path L2 of the display apparatus 100 in which a single plane mirror 6 is used. Therefore, the distance between the virtual image 1 and the virtual image 2 can be increased as shown in FIG. 4.

Further, when concave mirrors are used instead of the plane mirrors 6a, 6b and 6c, the distance between the virtual image 1 and the virtual image 2 can be further increased.

Although the display apparatus 101 has been described by taking the example in which the three plane mirrors 6a, 6b and 6c are used, the number of the plane mirrors is not limited thereto. The longer the light path L2 leading from the second display region of the liquid crystal panel 2 to the half mirror 7 is made by increasing the number of the plane mirrors, the longer the distance between the virtual image 1 and the virtual image 2 can be made.

A-4. Effect

Each of the display apparatuses 100 and 101 of the present preferred embodiment is a display apparatus for a head-up display apparatus, and provided with the liquid crystal display 1 (a display part) which has a single display region including the first display region and the second display region, the half mirror 7 which reflects first exit light exiting from the first display region of the liquid crystal display 1, and the plane mirror 6 (a first reflective plate) which reflects second exit light exiting from the second display region of the liquid crystal display 1 toward the half mirror 7. Further, in each of the display apparatuses 100 and 101, the first exit light which has been reflected by the half mirror 7 and the second exit light which has penetrated the half mirror 7 are led out of the apparatus in an overlapping state. Since two virtual images are displayed by using the single liquid crystal display 1, each of the display apparatuses 100 and 101 for a head-up display can be achieved with a simple structure.

Further, each of the display apparatuses 100 and 101 of this preferred embodiment is further provided with the concave mirror 8 (a second reflective plate) which reflects the first exit light which has been reflected by the half mirror 7 and the second exit light which has penetrated the half mirror 7 out of the apparatus in an overlapping state. Therefore, it is possible to display virtual images to a user.

Further, the display apparatus 101 is provided with the plurality of planer mirrors 6a, 6b and 6c (first reflective plates) which sequentially reflect the second exit light. Therefore, the light path leading to the half mirror 7 of the second exit light can be made longer than the light path of the first exit light. As a result, the distance between the two virtual images can be increased.

Further, the distance between the two virtual images can be increased also by using a concave mirror instead of the planer mirror 6, or concave mirrors instead of the planer mirrors 6a, 6b and 6c.

Alternatively, the distance between the two virtual images can be increased by providing a concave lens on the light path of the second exit light, the light path leading from the second display region of the liquid crystal display 1 to the half mirror 7.

A head-up display system of the preferred embodiment 1 is provided with the display apparatus 100 and the windshield 11 (a light transmissive substrate) which reflects light that has been led out of the display apparatus 100 toward a user. By projecting the light output from the display apparatus 100 on the light transmissive substrate, a user visually recognizes virtual images at positions anterior to the light transmissive substrate.

B. Preferred Embodiment 2

B-1. Configuration

Figure 5:
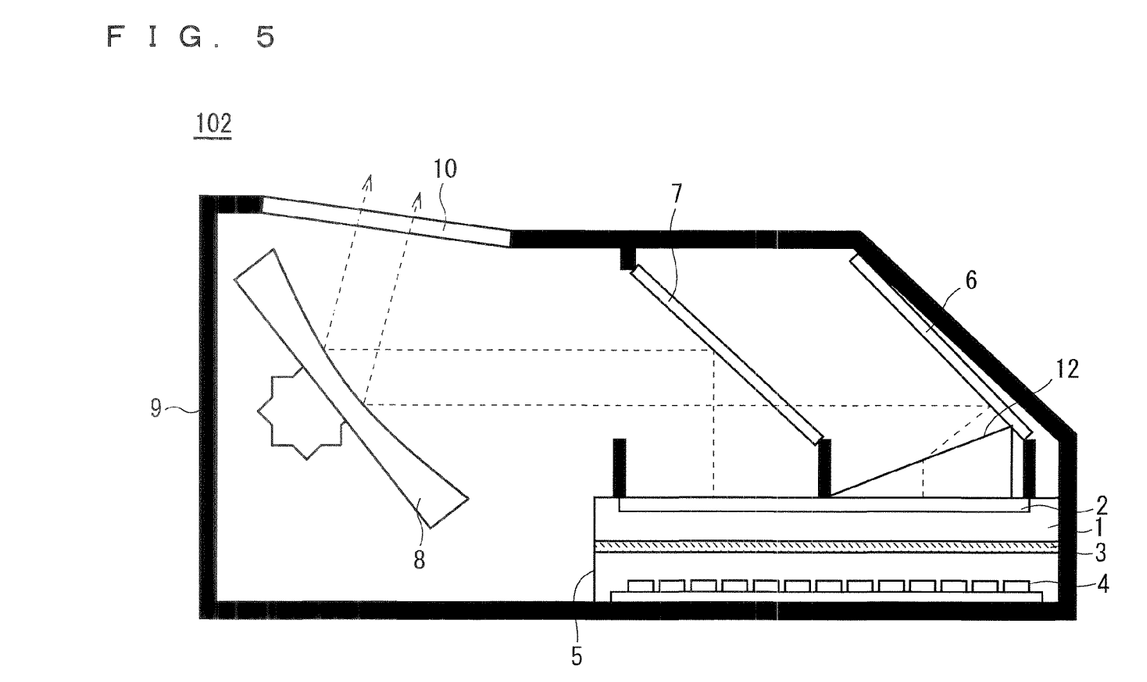
FIG. 5 is a cross-sectional view of a display apparatus according to a preferred embodiment 2.

FIG. 5 is a cross-sectional view illustrating the configuration of a display apparatus 102 for a head-up display according to a preferred embodiment 2. In FIG. 5, the same elements as those in the display apparatus 100 shown in FIG. 1 will be denoted by the same reference numerals as those in FIG. 1.

The display apparatus 102 is provided with a deviation element 12 in addition to the configuration of the display apparatus 100 according to the preferred embodiment 1. The deviation element 12 is provided on the second display region of the liquid crystal panel 2. In particular, an incident surface of the deviation element 12 is formed so as to be parallel to the liquid crystal panel 2 and cover the entire second display region. An exit surface of the deviation element 12 is at an angle $\alpha$ with respect to the incident surface thereof. The deviation element 12 is made of glass, acrylic, polycarbonate (PC) or the like having transparency. Both of the light incident surface and the light exit surface of the deviation element 12 are mirror surfaces. Further, given that a refractive index of a material of the deviation element 12 is n and a refractive index of air is 1, the angle $\alpha$ formed by the incident surface and the exit surface is required to satisfy a relationship of "$\alpha < \sin^{-1}(1/n)$" in order to prevent total reflection within the deviation element 12.

Further, in a case where an angle formed by the plane mirror 6 and the liquid crystal panel 2 is defined as $\beta$, when "$\beta = 45 + (\sin^{-1}(n \sin \alpha) - \alpha)/2$" is satisfied, it is possible to reflect light that has exited from the deviation element 12 by the plane mirror 6 and cause the reflected light to efficiently enter the half mirror 7.

Since the configuration of the display apparatus 102 other than the deviation element 12 is the same as the configuration of the display apparatus 100 according to the preferred embodiment 1, a description thereof will be omitted.

B-2. Action

Next, the action of light emitted from the LEDs 4 until the light is visually recognized as virtual images by a driver will be described with reference to FIG. 5. A light path leading from the LEDs 4 to the liquid crystal panel 2 and a light path leading from the first display region of the liquid crystal panel 2 to a driver are the same as the light paths in the preferred embodiment 1, and descriptions thereof will therefore be omitted.

Figure 6:
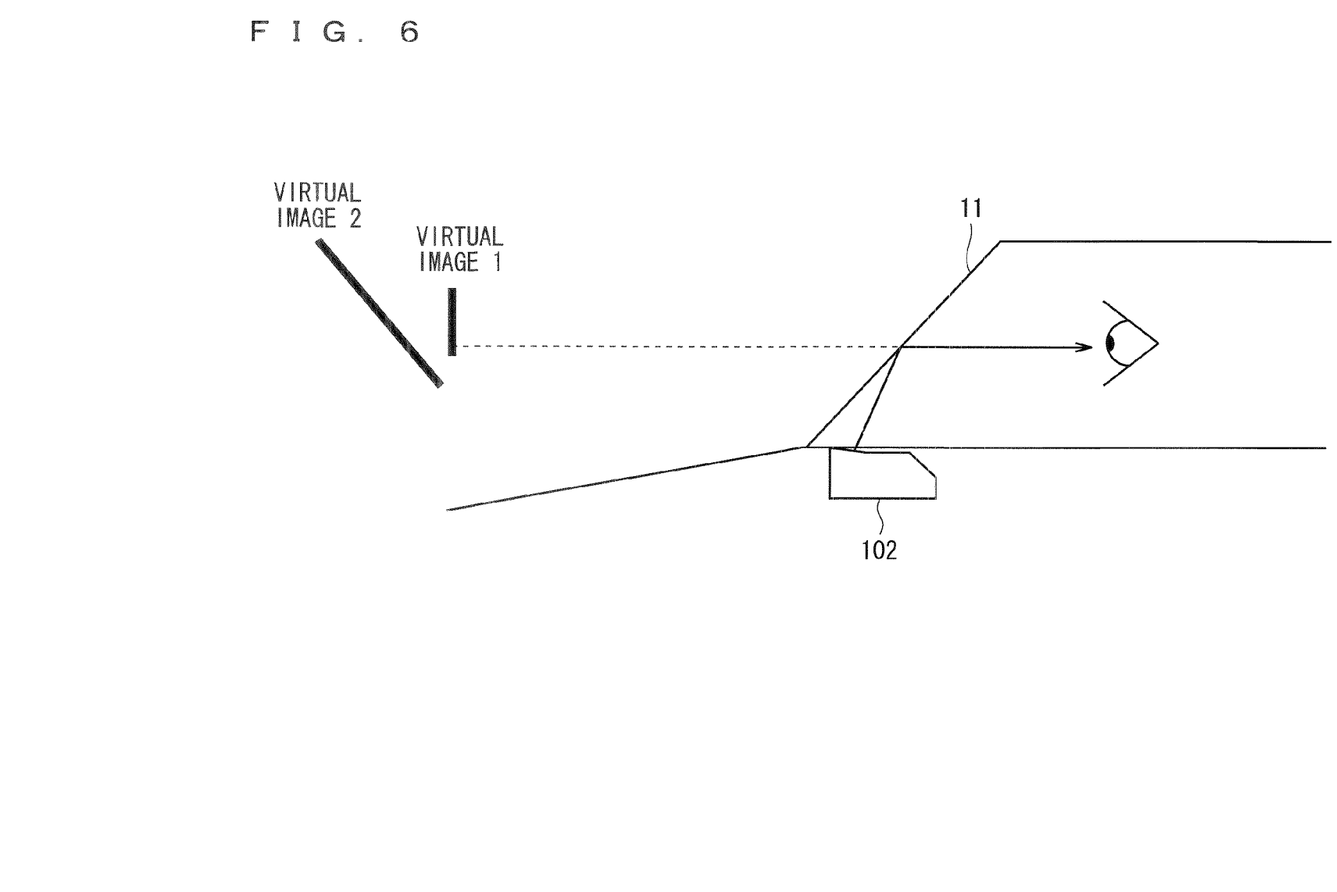
FIG. 6 is a diagram illustrating positions of virtual images of the display apparatus according to the preferred embodiment 2.

Light that has penetrated the second display region of the liquid crystal panel 2 enters the deviation element 12, and is thereby refracted rightward in FIG. 5 when exiting from the deviation element 12. The thus refracted light is reflected by the planer mirror 6, then penetrates the half mirror 7, and is further reflected by the concave mirror 8. The light that has been reflected by the concave mirror 8 then exits out of the housing 9 through the window portion 10, and is further reflected by the windshield 11, so that the light is directed to a driver as shown in FIG. 6. The windshield 11 shown in FIG. 6 is an example of a light transmissive substrate which reflects light output from the display apparatus 102 toward a driver. That is, the head-up display system is composed of the display apparatus 102 and the light transmissive substrate.

The virtual image 1 formed by light that has penetrated the first display region of the liquid crystal panel 2 is visually recognized in the same manner as in the preferred embodiment 1. On the other hand, the virtual image 2 formed by light that has penetrated the second display region is visually recognized as being at the angle $\alpha$ with respect to the virtual image 1 when viewed from the lateral side. Since the virtual image 2 is displayed as being inclined with respect to the virtual image 1 in this manner, a driver visually recognizes a stereoscopic image.

B-3. Variation

The inclination of the virtual image 2 with respect to the virtual image 1 shown in FIG. 6 is caused by the angle $\alpha$ which is formed by the incident surface and the exit surface of the deviation element 12. However, the angle $\alpha$ has a limitation by "$\alpha < \sin^{-1}(1/n)$" in order to prevent total reflection. Therefore, in a display apparatus 103 according to a variation of the preferred embodiment 2, a plurality of deviation elements are used, thereby making it possible to increase the inclination angle of the virtual image 2 with respect to the virtual image 1.

Figure 7:
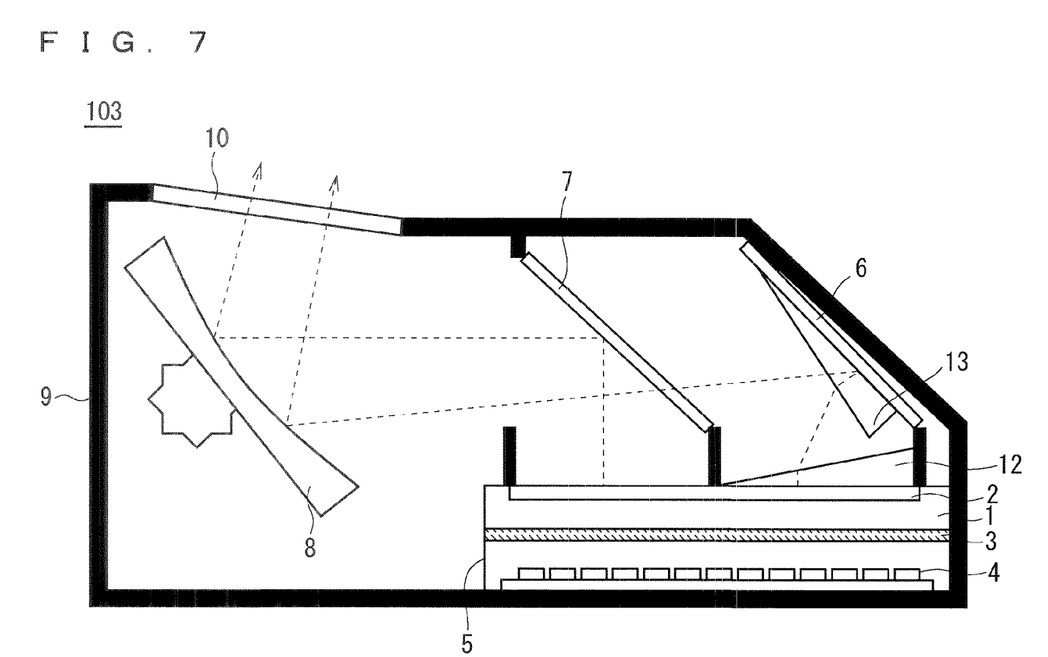
FIG. 7 is a cross-sectional view of a display apparatus according to a variation of the preferred embodiment 2.

FIG. 7 is a cross-sectional view illustrating the configuration of the display apparatus 103 according to the variation of the preferred embodiment 2. In FIG. 7, the same elements as those in the display apparatus 102 shown in FIG. 5 will be denoted by the same reference numerals as those in FIG. 5.

The display apparatus 103 is further provided with a deviation element 13 in a previous stage of the plane mirror 6 in addition to the configuration of the display apparatus 102. In the deviation element 13, an incident surface and an exit surface thereof form an angle $\gamma$ ($\gamma < \sin^{-1}(1/n)$) therebetween.

Figure 8:
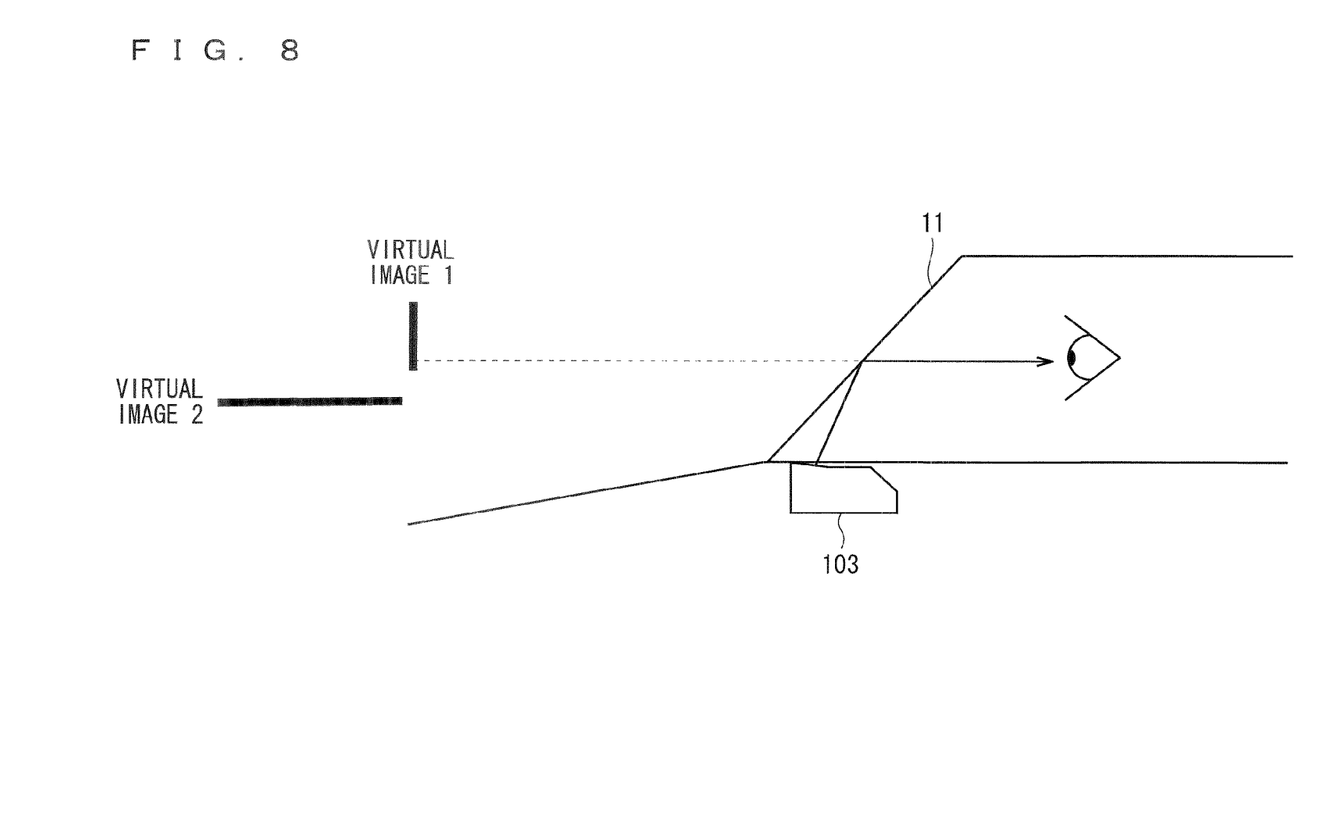
FIG. 8 is a diagram illustrating positions of virtual images of the display apparatus according to the variation of the preferred embodiment 2.

Light that has exited from the second display region of the liquid crystal panel 2 is refracted by the angle $\alpha$ by the deviation element 12, and is then further refracted by the angle $\gamma$ by the deviation element 13. Therefore, the right is refracted by an angle ($\alpha+\gamma$) in total. Accordingly, the virtual image 2 is inclined at the angle ($\alpha+\gamma$) with respect to the virtual image 1 when viewed from the lateral side. Further, the number of deviation elements provided on the light path leading from the second display region of the liquid crystal panel 2 to the half mirror 7 is not limited to two as shown in FIG. 7. The angle formed by the virtual image 1 and the virtual image 2 may be made to be closer to a right angle as shown in FIG. 8 by providing still more deviation elements. This makes it possible to provide a driver with a more stereoscopic display than a display provided by the display apparatus 102 which is provided with the single deviation element 12.

B-4. Effect

The display apparatus 102 according to the preferred embodiment 2 is provided with the deviation element 12 which is provided on the light path of the second exit light, the light path leading from the second display region of the liquid crystal display 1 to the half mirror 7, has transparency, and includes the exit surface and the incident surface of the second exit light, the exit surface being inclined with respect to the incident surface. Therefore, the second exit light is refracted by the deviation element 12, so that the virtual image 2 is displayed as being inclined with respect to the virtual image 1. As a result, a stereoscopic image can be displayed.

Further, in a case where the refractive index of the deviation element 12 is defined as n, by setting the angle $\alpha$ formed by the exit surface and the incident surface of the deviation element 12 to satisfy the relationship of "$\alpha < \sin^{-1}(1/n)$", it is possible to prevent the second exit light from being totally reflected within the deviation element 12.

Further, since the display apparatus 103 is provided with the plurality of deviation elements 12 and 13, it is possible to make the virtual image 2 to be largely inclined with respect to the virtual image 1, so that a more stereoscopic image can be displayed.

C. Preferred Embodiment 3

C-1. Configuration and Action

Figure 9:
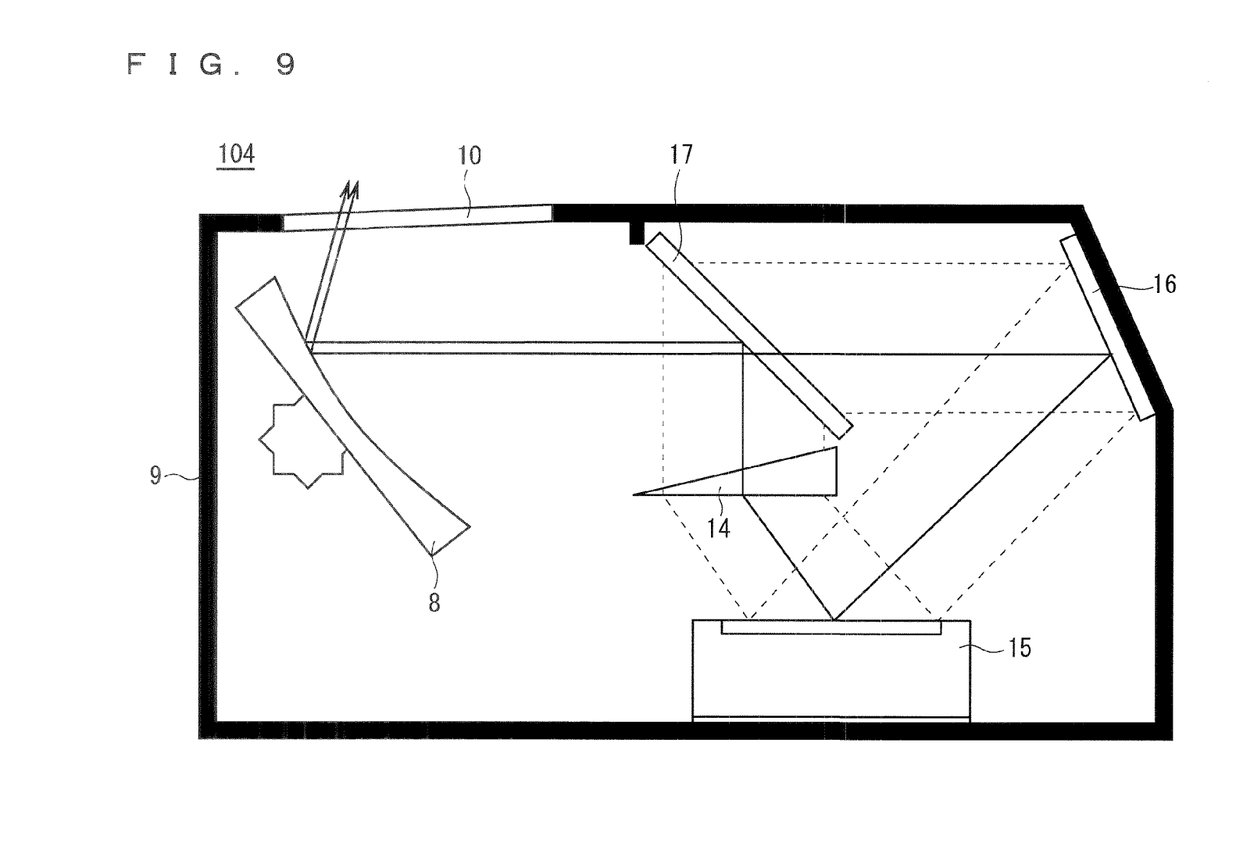
FIG. 9 is a cross-sectional view of a display apparatus according to a preferred embodiment 3.

FIG. 9 is a cross-sectional view illustrating the configuration of a display apparatus 104 for a head-up display according to a preferred embodiment 3. The display apparatus 104 is provided with a dual display 15, a half mirror 17, a planer mirror 16, a concave mirror 8, and a deviation element 14.

The dual display 15 is a display device that is capable of displaying different images depending on different angles of view. The dual display 15 is composed of, for example, a TFT liquid crystal display and a parallax barrier provided on the TFT liquid crystal display. The dual display 15 achieves different displays in two directions by separating light from a backlight into right and left directions by the use of the parallax barrier. In FIG. 9, exit light exiting in the upper left direction from the dual display 15 is defined as a first image light, and exit light exiting in the upper right direction from the dual display 15 is defined as a second image light.

The deviation element 14 is provided at an upper left position above the dual display 15 in FIG. 9 so that the deviation element 14 can refract the first image light of the dual display 15. Further, the half mirror 17 is arranged above the deviation element 14 at an optimal angle for reflecting light from the deviation element 14 toward the concave mirror 8.

On the other hand, the plane mirror 16 is provided at an upper right position above the dual display 15 in FIG. 9, and arranged at an optimal angle for reflecting the second image light of the dual display 15 toward the half mirror 17.

Figure 10:
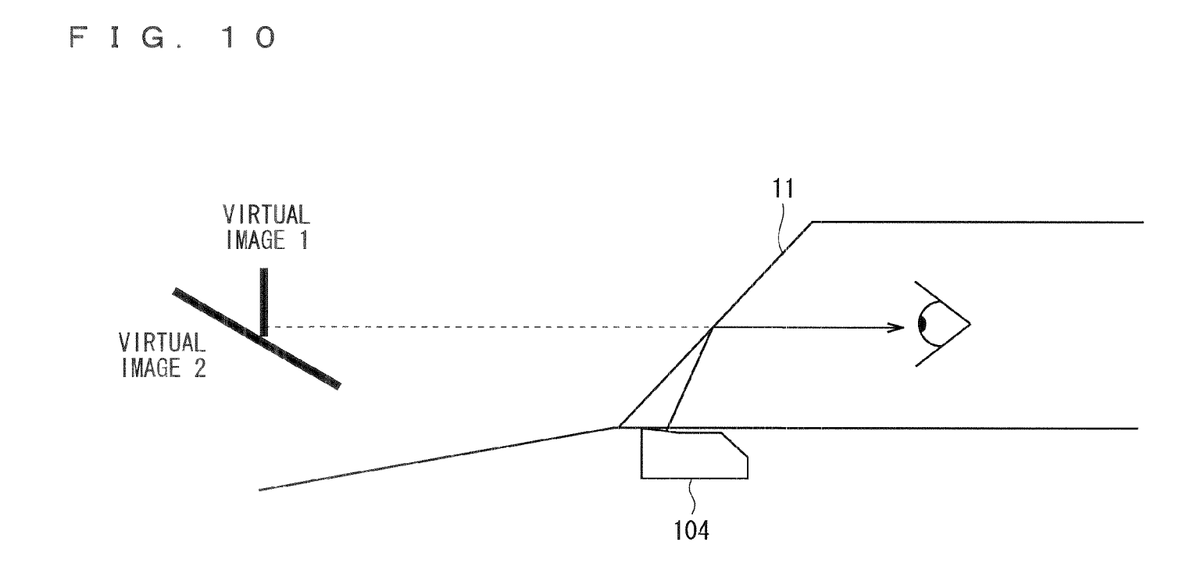
FIG. 10 is a diagram illustrating positions of virtual images of the display apparatus according to the preferred embodiment 3.

The half mirror 17 combines the first image light from the deviation element 14 and the second image light from the plane mirror 16, and outputs the combined light to the concave mirror 8. The concave mirror 8 reflects the light output from the half mirror 17 out of the apparatus. The light that has been reflected by the concave mirror 8 out of the apparatus is then projected on, for example, the windshield 11 as shown in FIG. 10, so that a driver visually recognizes the projected image on the windshield 11 as virtual images. A virtual image 2 by the second image light is inclined with respect to a virtual image 1 by the first image light when viewed from the lateral side. Therefore, it is possible to provide a driver with a stereoscopic image. The windshield 11 shown in FIG. 10 is an example of a light transmissive substrate which reflects light output from the display apparatus 104 toward a driver. That is, the head-up display system is composed of the display apparatus 104 and the light transmissive substrate.

Since the display apparatus 104 of the present preferred embodiment uses the dual display 15, it is not necessary to divide a display into two parts unlike the preferred embodiments 1 and 2, and images of the whole display can be projected on the windshield as different virtual images. This makes it possible for a driver to visually recognize a large image.

Further, although the deviation element 14 is provided between the dual display 15 and the half mirror 17, an additional deviation element 14 may be provided between the dual display 15 and the plane mirror 16. As a result, an angle, when viewed from the lateral side, formed by the virtual image 1 and the virtual image 2 which are visually recognized by a driver becomes closer to a right angle, which results in a more stereoscopic image. Further, a plurality of deviation elements may be provided on each of a light path of the first image light, the light path leading to the half mirror 17, and a light path of the second image light, the light path leading to the half mirror 17.

Further, an organic EL or other display devices can also be used as the dual display 15 other than a liquid crystal device.

Further, in the present invention, the preferred embodiments thereof can be freely combined, or each of the preferred embodiments can be appropriately varied or omitted within the scope of the invention.

C-2. Effect

The display apparatus 104 of the preferred embodiment 3 is a display apparatus for a head-up display apparatus. The display apparatus 104 is provided with the dual display 15 having a display surface in which a first image is displayed within a first elevation angle range from the display surface and a second image is displayed within a second elevation angle range from the display surface, the half mirror 17 which is provided within the first elevation angle range and reflects display light of the first image, and a first reflective plate 16 which is provided within the second elevation angle range and reflects display light of the second image toward the half mirror 17. In the display apparatus 104, the display light of the first image which has been reflected by the half mirror 17 and the display light of the second image which has penetrated the half mirror 17 are led out of the apparatus in an overlapping state. Since two virtual images are displayed by using the single dual display 15, the display apparatus 104 for a head-up display can be achieved with a simple structure.

Further, since the display apparatus 104 is provided with the concave mirror 8 (a second reflective plate) which reflects the display light of the first image which has been reflected by the half mirror 17 and the display light of the second image which has penetrated the half mirror 17 out of the apparatus in an overlapping state, it is possible to display virtual images to a user.

Further, the display apparatus 104 is provided with the deviation element 14 which is provided on a light path of the display light of the first image, the light path leading from the display surface of the dual display 15 to the half mirror 17, has transparency, and includes an exit surface and an incident surface of the display light of the first image, the exit surface being inclined with respect to the incident surface. Therefore, one of the virtual images is displayed so as to be inclined with respect to the other virtual image, thereby making it possible to display a stereoscopic image.

The display apparatus 104 is further provided with the deviation element which is provided on a light path of the display light of the second image, the light path leading from the display surface of the dual display 15 to the first reflective plate 16, has a transparency, and includes an exit surface and an incident surface of the display light of the second image, the exit surface being inclined with respect to the incident surface. Therefore, one of the virtual images is displayed so as to be further largely inclined with respect to the other virtual image, thereby making it possible to display a more stereoscopic image.

The dual display 15 can also be composed of a TFT liquid crystal display of a parallax barrier system.

While the invention has been shown and described in detail, the foregoing description is in all aspects illustrative and not restrictive. It is therefore understood that numerous modifications and variations can be devised without departing from the scope of the invention.

What is claimed is:

1. A display apparatus for a head-up display apparatus comprising:
    a display part having a single display region including a first display region and a second display region;
    a half mirror reflecting first exit light exiting from said first display region of said display part; and
    a first reflective plate reflecting second exit light exiting from said second display region of said display part toward said half mirror; and
    a second reflective plate reflecting said first exit light reflected by said half mirror and said second exit light penetrating said half mirror to be led out of the display apparatus in an overlapping state.

2. The display apparatus according to claim 1, wherein said second reflective plate is a concave mirror.

3. The display apparatus according to claim 1, wherein the number of said first reflective plate is two or more and the two or more first reflective plates sequentially reflect said second exit light.

4. The display apparatus according to claim 1, wherein said first reflective plate is a concave mirror.

5. The display apparatus according to claim 1, further comprising a concave lens provided on a light path of said second exit light, the light path leading from said second display region of said display part to said half mirror.

6. The display apparatus according to claim 1, further comprising a deviation element provided on a light path of said second exit light, the light path leading from said second display region to said half mirror, having transparency, and including an exit surface and an incident surface of said second exit light, the exit surface being inclined with respect to the incident surface.

7. The display apparatus according to claim 6, wherein, when a refractive index of said deviation element is defined as n, an angle α formed by said exit surface and said incident surface of said deviation element satisfies $\alpha < \sin^{-1}(1/n)$.

8. The display apparatus according to claim 7, the number of said deviation element is two or more.

9. A display apparatus for a head-up display apparatus comprising:
    a dual display having a display surface, the dual display displaying a first image within a first elevation angle range from the display surface and displaying a second image within a second elevation angle range from the display surface;

a half mirror provided within said first elevation angle range and reflecting display light of said first image; and a first reflective plate provided within said second elevation angle range and reflecting display light of said second image toward said half mirror, wherein display light of said first image reflected by said half mirror and display light of said second image penetrating said half mirror are led out of the display apparatus in an overlapping state.

10. The display apparatus according to claim 9, further comprising a second reflective plate reflecting display light of said first image reflected by said half mirror and display light of said second image penetrating said half mirror out of the display apparatus in an overlapping state.

11. The display apparatus according to claim 10, wherein said second reflective plate is a concave mirror.

12. The display apparatus according to claim 9, further comprising a deviation element provided on a light path of display light of said first image, the light path leading from said display surface of said dual display to said half mirror, having transparency, and including an exit surface and an incident surface of display light of said first image, the exit surface being inclined with respect to the incident surface.

13. The display apparatus according to claim 9, further comprising a deviation element provided on a light path of display light of said second image, the light path leading from said display surface of said dual display to said first reflective plate, having transparency, and including an exit surface and an incident surface of display light of said second image, the exit surface being inclined with respect to the incident surface.

14. The display apparatus according to claim 9, wherein said dual display is a TFT liquid crystal display of a parallax barrier system.

15. A head-up display system comprising:
a display apparatus for a head-up display apparatus, the display apparatus including
a display part having a single display region including a first display region and a second display region,
a half mirror reflecting first exit light exiting from said first display region of said display part, and
a first reflective plate reflecting second exit light exiting from said second display region of said display part toward said half mirror,
wherein said first exit light reflected by said half mirror and said second exit light penetrating said half mirror are led out of the display apparatus in an overlapping state; and
a light transmissive substrate reflecting light led out of said display apparatus toward a user.

* * * * *